US008810854B2

United States Patent
Okamura (10) Patent No.: US 8,810,854 B2
(45) Date of Patent: Aug. 19, 2014

(54) IMAGE FORMING APPARATUS, IMAGE DRAWING PROCESSING METHOD, SOFTWARE PROGRAM, AND STORAGE MEDIUM

(75) Inventor: Tomoaki Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 13/467,181

(22) Filed: May 9, 2012

(65) Prior Publication Data

US 2012/0307269 A1 Dec. 6, 2012

(30) Foreign Application Priority Data

May 30, 2011 (JP) ................................. 2011-120739

(51) Int. Cl.
 *H04N 1/60* (2006.01)
 *G06K 15/00* (2006.01)
 *G06K 15/02* (2006.01)

(52) U.S. Cl.
 USPC ........... 358/1.9; 358/1.14; 358/1.11; 358/1.18

(58) Field of Classification Search
 USPC ................ 358/1.9, 1.14, 1.11, 1.18; 380/201; 726/32, 33
 See application file for complete search history.

(56) References Cited

U.S. PATENT DOCUMENTS 8,194,263 B2 * 6/2012 Aritomi et al. ............... 358/1.14

FOREIGN PATENT DOCUMENTS

JP 2009118324 A 5/2009

* cited by examiner

*Primary Examiner* — Charlotte M Baker
(74) *Attorney, Agent, or Firm* — Harness, Dickey & Pierce, P.L.C.

(57) ABSTRACT

An image forming apparatus includes a drawing process controller and a hardware processor useable for drawing processes. In a first drawing process, print data including main image data input-able to the image forming apparatus is processed to convert the main image data to output-able data of the image forming apparatus based on an image drawing command. The hardware processor conducts a second drawing process for pre-set image data settable to the image forming apparatus and expressed in an output-able data format output-able by the image forming apparatus, based on an image drawing command, to prepare the pre-set image data as output-able data of the image forming apparatus, and further combines the main image data expressed as the output-able data and the pre-set image expressed as the output-able data as an output image.

10 Claims, 6 Drawing Sheets

IMAGE FORMING APPARATUS, IMAGE DRAWING PROCESSING METHOD, SOFTWARE PROGRAM, AND STORAGE MEDIUM

CROSS-REFERENCE TO RELATED APPLICATION

This application claims priority to Japanese Patent Application No. 2011-120739, filed on May 30, 2011 in the Japan Patent Office, which is incorporated by reference herein in its entirety.

BACKGROUND

1. Technical Field

The present invention relates to an image forming apparatus such as a printer or a multi-functional apparatus that executes an image drawing processing for output-image data based on an image drawing command included in print data, and more particularly to an image forming apparatus that adds a background pattern to an output-image when drawing printout-use image data, an image drawing processing method, a software program for image drawing processing, and a storage medium storing the software program.

2. Description of the Background Art

Recent technical advancements in information apparatuses and systems have enhanced processing and exchanging of image information, as such image information has acquired greater importance. It is against this background that host apparatuses such as personal computers (PC) installed with a printer driver transmit print data to an image forming apparatus such as a printer or a multi-functional machine that form images on recording sheets, of which higher resolution levels and faster processing speeds are increasingly demanded.

The higher resolution levels of image forming apparatuses have emphasized a need for technologies to prevent unauthorized copying of documents. For example, JP-2009-118324-A discloses a technology to draw a specific background pattern over the entire surface of the sheet. With regard to faster processing speeds, performance enhancement of image forming apparatuses is evaluated based largely on the processing time of image forming apparatuses. The processing time required for drawing images can be shortened by employing a hardware accelerator, which can process data for image drawing faster than a software-implemented configuration can do.

When a background pattern is drawn, the background pattern is processed separately from a target output-image (the primary image or main image) with which it is combined later. Because of the processing time required for drawing the background pattern, the total processing time required for drawing images lengthens.

Figure 1:
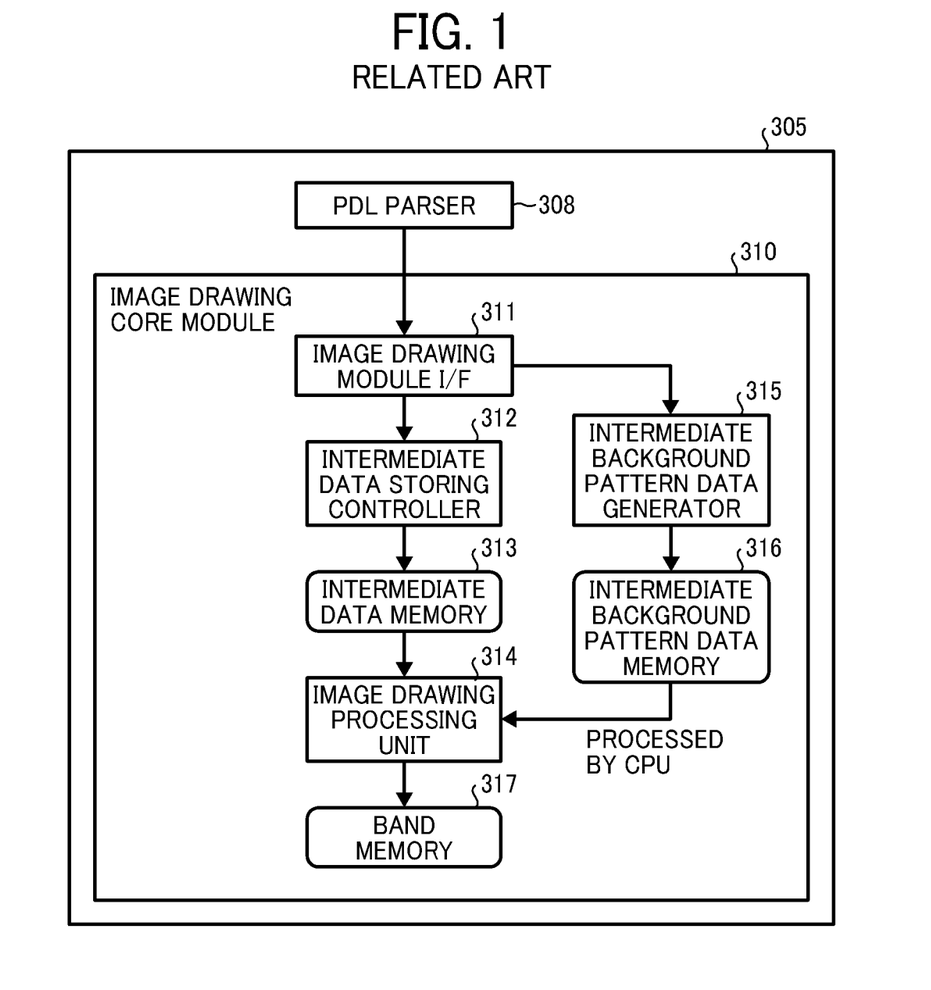
FIG. 1 is one example block diagram of image drawing processing unit of a controller of a conventional printer.
Figure 2:
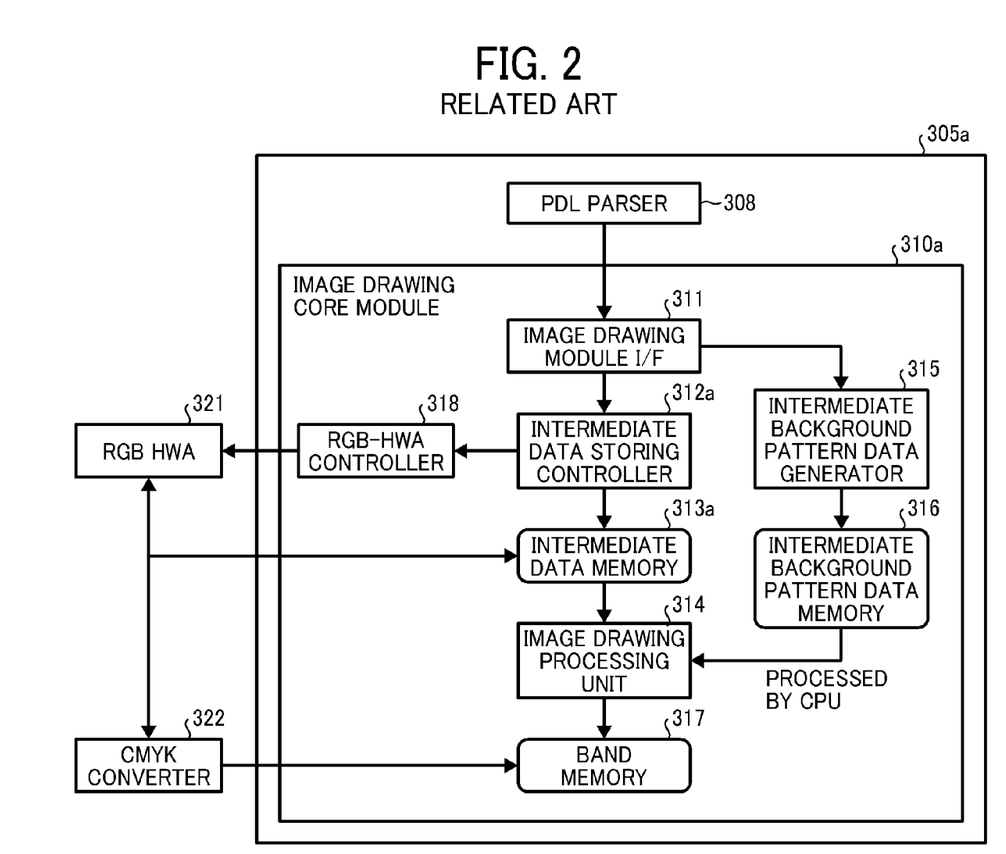
FIG. 2 is another example block diagram of image drawing processing unit of a controller of a conventional printer.

A description is now given of conventional techniques of image drawing processing for the background pattern with reference to FIGS. 1 and 2.

FIG. 1 is a block diagram of an image drawing processing unit of a controller of a conventional printer. In FIG. 1, a host apparatus transmits print data expressed in page description language (PDL) to a printer to print out images, in which the printer includes a controller configured to function by executing one or more software programs. A page description language (PDL) unit 305 is installed to process print data such as PDL data as one function of the controller. A central processing unit (CPU) of the controller can configure the PDL unit 305 as a PDL parser 308 and an image drawing core module 310 by executing one or more software programs. As shown in FIG. 1, the PDL parser 308 includes an image drawing module interface (I/F) 311, an intermediate data storing controller 312, an intermediate data memory 313, an image drawing processing unit 314, an intermediate background pattern data generator 315, an intermediate background pattern data memory 316, and a band memory 317.

The PDL parser 308 analyzes PDL data to obtain image drawing commands. Based on the analysis of image drawing commands, the image drawing module I/F 311 may set separate image drawing processes such as one image drawing process for target output-image and another image drawing process for the background pattern data, in which the image drawing processing for the target output-image and image drawing processing for the background pattern are conducted by implementing one or more software programs.

As shown in FIG. 1, the target output-image prepared by the intermediate data storing controller 312 and the intermediate data memory 313, and the background pattern data prepared by the intermediate background pattern data generator 315 and the intermediate background pattern data memory 316 are processed by a common image drawing processing unit such as the image drawing processing unit 314. Further, the primary image and background pattern data are then combined as printout-use image data by the band memory 317. As such, the CPU of the controller conducts image drawing processing using a single software module set for the controller. Therefore, the total processing speed may not be set to a faster speed because of the limited CPU capabilities and memory capacity of the printer.

In light of such technical problem, as noted above, a hardware accelerator can be used to enhance the processing speed. FIG. 2 is a block diagram of an image drawing processing unit of a controller of another conventional printer employing a hardware accelerator. As shown in FIG. 2, a page description language (PDL) unit 305a is installed that is provided with hardware accelerators such as a red/green/blue hardware accelerator (RGB HWA) 321, and a cyan/magenta/yellow/black (CMYK) converter 322. A central processing unit (CPU) of the controller configures the PDL unit 305a as a PDL parser 308 and an image drawing core module 310a by executing one or more software programs. Except for the hardware accelerators 321 and 322, the controller of FIG. 2 is configured to function similarly to the controller of FIG. 1 by executing or implementing one or more software programs.

The RGB HWA 321 is used for image drawing processing of RGB data having more color gradations, and the CMYK converter 322 is used for image drawing processing of CMYK data having fewer color gradations. In general, a host apparatus such as a personal computer (PC) generates and transmits image data expressed in RGB data such as 24-bit RGB data having more color gradations to a printer or the like, wherein such RGB data retains original data of halftone color (or middle-tone color, intermediate color). When printed as images by the printer, such RGB data is required to be converted to CMYK data having few color gradations because most printers or the like cannot use RGB data having more color gradations.

As shown in FIG. 2, image drawing core module 310a includes the image drawing module I/F 311, an intermediate data storing controller 312a, an intermediate data memory 313a, an image drawing processing unit 314, an intermediate background pattern data generator 315, an intermediate background pattern data memory 316, a band memory 317, and a red/green/blue hardware accelerator (RGB-HWA) controller 318. The RGB-HWA controller 318 controls the RGB HWA 321, which conducts a part of image drawing processing of the target output-image in response to image drawing commands managed by the intermediate data storing controller 312*a*. The intermediate data storing controller 312*a* determines which image drawing commands can be processed by the RGB HWA 321 among the image drawing commands provided for the primary image or main image. Those image drawing commands that are determined to be process-able by the RGB HWA 321 are processed by the RGB HWA 321, in which image drawing processing is conducted for RGB data having more color gradations using data stored in the intermediate data memory 313*a*. The CMYK converter 322 converts data drawn in RGB to image data having fewer color gradations such as CMYK, which is used as printout-use image data. As such, at least a portion of the target output-image can be processed by the hardware accelerators such as RGB HWA 321, and CMYK converter 322.

The prepared target output-image corresponding to the primary image, and the background pattern data prepared by the intermediate background pattern data generator 315 and the intermediate background pattern data memory 316 are processed by a common image drawing processing unit such as the image drawing processing unit 314, which can be configured by implementing one or more software programs. The prepared target output-image and the background pattern data are then combined as printout-use image data using the band memory 317.

As above described, a given hardware accelerator can process a part of image drawing commands for the target output-image, thus shortening the image drawing processing time for preparing the target output-image. However, conventional hardware accelerators cannot be used for image drawing processing for the background pattern.

Typically, unlike CMYK data, the background pattern data is image information having no plane depth information. Therefore, if the background pattern data is to be processed using a hardware accelerator, the background pattern data must first be converted to RGB data having more color gradations and then further converted to CMYK data having few color gradations. Such conversion process delays the total processing speed, resulting in a drop in processing efficiency. Therefore, conventionally, the background pattern data is not processed by the hardware accelerator, but is instead processed by the CPU executing software programs, wherein such processing is not so fast. As such, the enhancement of processing speed for background pattern is difficult to attain.

SUMMARY

In one aspect of the present invention, an image forming apparatus including a drawing process controller and a hardware processor is devised. The drawing process controller controls a first drawing process and a second drawing process. In the first drawing process, print data including main image data expressed in a given data format input-able to the image forming apparatus is processed to convert the main image data to output-able data of the image forming apparatus based on an image drawing command for the main image data included in the print data. In the second drawing process, pre-set image data settable to the image forming apparatus and expressed in an output-able data format output-able by the image forming apparatus is used. The hardware processor, controllable when the image drawing command for the pre-set image is received, conducts the second drawing process for the pre-set image data based on an image drawing command set for the pre-set image data to prepare the pre-set image data as output-able data of the image forming apparatus, and combines the main image data expressed as the output-able data and the pre-set image expressed as the output-able data as an output image.

In another aspect of the present invention, a non-transitory computer readable storage medium storing a program that, when executed by a computer, causes the computer to execute a method of controlling a drawing process of print data including main image data expressed in a given data format input-able to an image forming apparatus, and a drawing process of pre-set image data settable to the image forming apparatus and expressed in an output-able data format output-able by the image forming apparatus, is devised. The method includes the steps of drawing the main image data based on an image drawing command included in the print data to prepare the main image data as output-able data of the image forming apparatus; drawing the pre-set image data based on an image drawing command set for the pre-set image data to prepare the pre-set image data as output-able data of the image forming apparatus using a hardware processor controllable when the image drawing command for the pre-set image is received; and combining the drawn main image data expressed by the output-able data and the drawn pre-set image expressed by the output-able data as an output image using the hardware processor.

In another aspect of the present invention, a method of controlling a drawing process of print data including main image data expressed in a given data format input-able to an image forming apparatus, and a drawing process of pre-set image data settable to the image forming apparatus and expressed in an output-able data format output-able by the image forming apparatus is devised. The method includes the steps of drawing the main image data based on an image drawing command included in the print data to prepare the main image data as output-able data of the image forming apparatus; drawing the pre-set image data based on an image drawing command set for the pre-set image data to prepare the pre-set image data as output-able data of the image forming apparatus using a hardware processor controllable when the image drawing command for the pre-set image is received; and combining the drawn main image data expressed by the output-able data and the drawn pre-set image expressed by the output-able data as an output image using the hardware processor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

An image forming apparatus such as a printer according to an example embodiment can form main images using data such as CMYK data drawn from print data input to the image forming apparatus, in which image data for each color such as CMYK is prepared for printout data or output-use data, and output as images composed of a number of pixel dots with a given resolution.

The main images composed of output-use data may be prepared or generated by an image drawing processing using a software-implemented configuration unit, and an image drawing processing of pre-prepared or pre-set output-use data having a given data format can be conducted by using a hardware configuration unit such as a hardware processor, as described later. The hardware configuration unit may be used for an image drawing processing that processes pre-prepared or pre-set output-use data having a given data format, wherein such pre-prepared output-use or pre-set data may be background pattern to be combined with the main images.

(Hardware Configuration)

Figure 3:
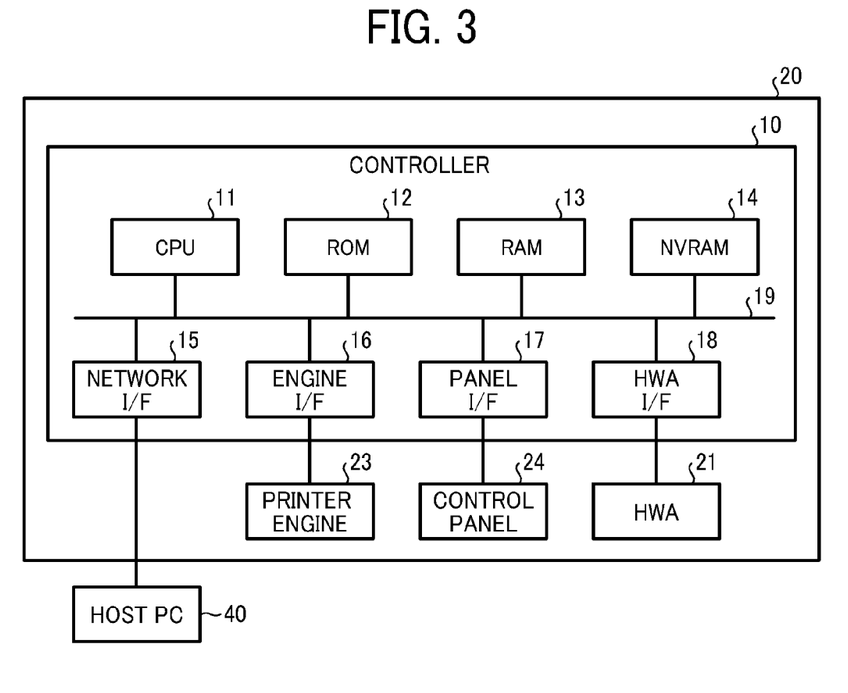
FIG. 3 is a hardware configuration of an image forming apparatus according to an example embodiment.

FIG. 3 shows a hardware configuration of an image forming apparatus according to an example embodiment, wherein the image forming apparatus may be a printer 20, but not limited thereto. As shown in FIG. 3, the printer 20 includes, for example, a controller 10, a printer engine 23, a control panel 24, and a hardware accelerator (HWA) 21. The controller 10 controls the printer 20 as a whole.

Based on output-use data that receives image drawing processing, the printer engine 23 outputs images formed by a number of pixel dots. The printer engine 23 can be used as an image forming unit to output (e.g., print) images on recording media such as sheets or the like, in which the printer engine 23 may be provided with units, devices, or the like required for outputting (e.g., printing) images. The control panel 24 includes an operation unit having a display unit and/or various types of keys to function as a user interface as shown in FIG. 3.

The hardware accelerator (HWA) 21 may be externally disposed for the controller 10, wherein the HWA 21 may be a hardware processor, which may be used with controller 10 for conducting the image drawing processing, as required. For example, the HWA 21 may be a digital signal processor such as an application specific integrated circuit (ASIC) but not limited thereto.

The controller 10, which may be a processor, includes a central processing unit (CPU) 11, a read only memory (ROM) 12, a random access memory (RAM) 13, a non-volatile random access memory (NVRAM) 14, a network interface (I/F) 15, an engine interface (I/F) 16, a panel interface (I/F) 17, and a HWA interface (I/F) 18, wherein such units can be connected with each other by a bus 19.

The CPU 11 executes one or more software programs stored in the ROM 12 using the RAM 13 as a working memory. Specifically, the CPU 11 controls each unit in the image forming apparatus.

The ROM 12 stores various types of software programs used for data processing/management and for controlling modules, and various types of data to execute each software program. Specifically, the ROM 12 stores one or more software programs for the basic processing for the image forming apparatus, one or more software programs to execute an image processing/forming control, one or more control programs to activate the controller 10 by using the CPU 11 and data prepared for control process.

The RAM 13 can be used as a working memory of the CPU 11, and as a buffer to temporarily store data. The RAM 13 has a capacity to store print data, image drawing data converted from the print data, or intermediary data for a plurality of pages. The RAM 13 can be used as a page or frame memory to temporarily store output-use image data generate-able by using the control program, or used as a working memory to store data required for running software programs.

The NVRAM 14 is a memory that can store data even when the power supply to the image forming apparatus is shut-off. The NVRAM 14 stores data that needs to be retained even if the power supply to the image forming apparatus is shut-off. For example, various setting information such as system setting values, count values of printed sheets, print setting values, and various types of data and setting information used for controlling an image processing and forming process are stored under the control of the CPU 11. The CPU 11, the ROM 12, and the RAM 13 communicate with each other so that the controller 10 functions as a controller.

The engine I/F 16 can be connected to the printer engine 23. The engine I/F 16 is used to transmit control signals and data from the controller 10 to the printer engine 23, and to transmit status signals transmitted from the printer engine 23 to the controller 10.

The panel I/F 17 can be connected to the control panel 24. The panel I/F 17 can be used to transmit signals or data between the controller 10 and the control panel 24.

The network I/F 15 can be connected to a host PC 40 via a network such as a local area network (LAN) or the like. The network I/F 15 receives control signals and data (e.g., print data) from the host PC 40, and transmits status signals or the like transmitted from the image forming apparatus to the host PC 40. The host PC 40 may include a printer driver to generate print data. As such, the network I/F 15 can be used as an interface. The host PC 40 used as a host apparatus can be connected to the network I/F 15 via a communication unit. When the printer 20 used as an image forming apparatus and the host PC 40 used as an information processing apparatus are connected, the printer 20 and the host PC 40 may configure an image forming system as a whole.

The controller 10 conducts image drawing processing such as various conversion processes using print data such as PDL data received from the host PC 40, and instructs the HWA 21 to conduct image drawing processing such as various types of conversion processes via the HWA I/F 18. Further, the controller 10 transfers image data used for print-out, obtained by such image drawing processing, to the printer engine 23, and instructs the printer engine 23 to output images. The RAM 13 stores, for example, print data transmitted from the host PC 40, intermediate image data and raster pixel data prepared from the print data, and printout-use image data to be used at a later stage process.

As for the printer 20, control programs and information settings for controlling/operating conditions of various processing can be stored in a storage medium such as the ROM 12 and NVRAM 14, and read out and loaded to a memory area of the RAM 13, which can be used as a working memory for the CPU 11. By using the RAM 13 as the working area for image forming processing, functional units shown in FIGS. 4 and 5 can be implemented.

(Software-Implemented Configuration)

Figure 4:
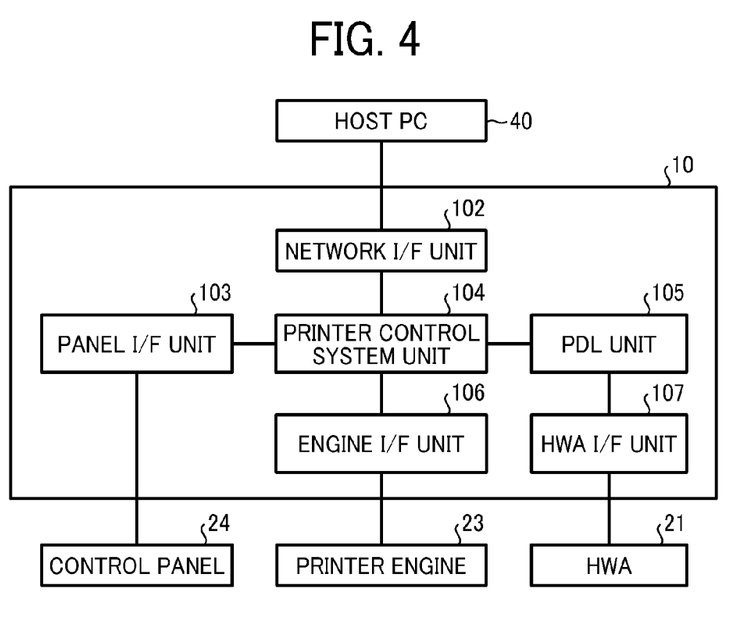
FIG. 4 is a block diagram of functional units of the image forming apparatus of FIG. 3.

FIG. 4 is a block diagram of software-implemented configuration of the printer 20. The host PC 40 uses a printer driver to convert document data processed by an application program into print data including one or more image drawing commands (hereinafter, image drawing command), and transmits the print data to the printer 20, and requests the printer 20 to print out images. Such image drawing command is typically a command to instruct drawing of text/characters, images, graphics, or the like. Further, such print data may be described by various types of PDL such as PostScript (registered trademark), PCL (registered trademark), and RPDL (registered trademark).

AS shown in FIG. 4, the controller 10 can be configured with a printer control system unit 104, a network interface (I/F) unit 102, a PDL unit 105, a panel interface (I/F) unit 103, an engine interface (I/F) unit 106, and a HWA interface (I/F) unit 107. The PDL unit 105 can be used as an image analysis unit or image analyzer, and may be referred to as a drawing process controller. The printer control system unit 104 controls each unit in the controller 10.

Under the control of the printer control system unit 104, the network I/F unit 102 conducts data exchange with the host PC 40, which is one unit configuring an image forming system. Under the control of the printer control system unit 104, the panel I/F unit 103 controls the control panel 24, in which data is displayed on a display such as a display panel to report status to a user based on data exchange, and the panel I/F unit 103 receives information input by a user's operation.

Upon receiving the print data, the PDL unit 105 analyzes the print data, and prepares or generates output-use data such as printout-use image data based on the image drawing command obtained as an analysis result. As such, the PDL unit 105 can be used as the drawing process controller.

The engine I/F unit 106 instructs the printer engine 23 to print out the image data, in which the engine I/F unit 106 transmits the output-use data such as printout-use image data used for printing, and condition data used for setting conditions for an outputting process. Under the control of the PDL unit 105, the HWA I/F unit 107 activates the hardware accelerator (HWA) 21, which is a hardware processor disposed for image drawing processing of given data such as CMYK data.

Further, the printer control system unit 104 may include a management unit to manage print jobs, which may be currently being processed, and apparatus conditions that can be changed as required. Further, the management unit can report process status of each print job and apparatus conditions to a user using a display unit of the control panel 24, as required. Such management function for print jobs may be also required for an image forming system configured with an image forming apparatus such as the printer 20 and a host apparatus such as the host PC 40 connectable with each other via a network. In such a client-server system configured with the image forming apparatus such as a printer and the host apparatus such as a host PC, such management function can be installed as a basic function of a user interface.

(Drawing of Background Pattern)

The printer 20 can conduct image drawing processing for different data, and can combine the processed different data to prepare or generate printout-use image data. Specifically, the printer 20 conducts one image drawing processing for primary image or main image used as a target output-image, and another image drawing processing for pre-set image or pre-prepared image, which can be set to an apparatus in advance with a given data format output-able by the apparatus. The pre-set image may be, for example, a background pattern that can be embedded or overlaid to the main image as a background image used for given purposes such as preventing unauthorized copying.

A description is given of a process of outputting image such as combining the pre-set image such as the background pattern to the main image, and printing such combined image. Such background pattern data, which may be drawn on partially or entirely on a surface of page, may include a background pattern image, and/or text strings. The text strings may be, for example, warning text strings such as "NO COPY." Such text strings mark a given specific message such as "NO COPY" to indicate that document is copied in an unauthorized manner. As such, the text strings can be used as a warning. With such a configuration, the unauthorized copying of a document can be clearly recognized by using such background pattern image and/or text strings, and unauthorized copying can be prohibited. Specifically, when an output-image including the main image, background pattern image, and text strings is copied in an unauthorized manner, a given mark appears on the copied page to indicate that the copy is unauthorized (see FIG. 5).

Figure 5:
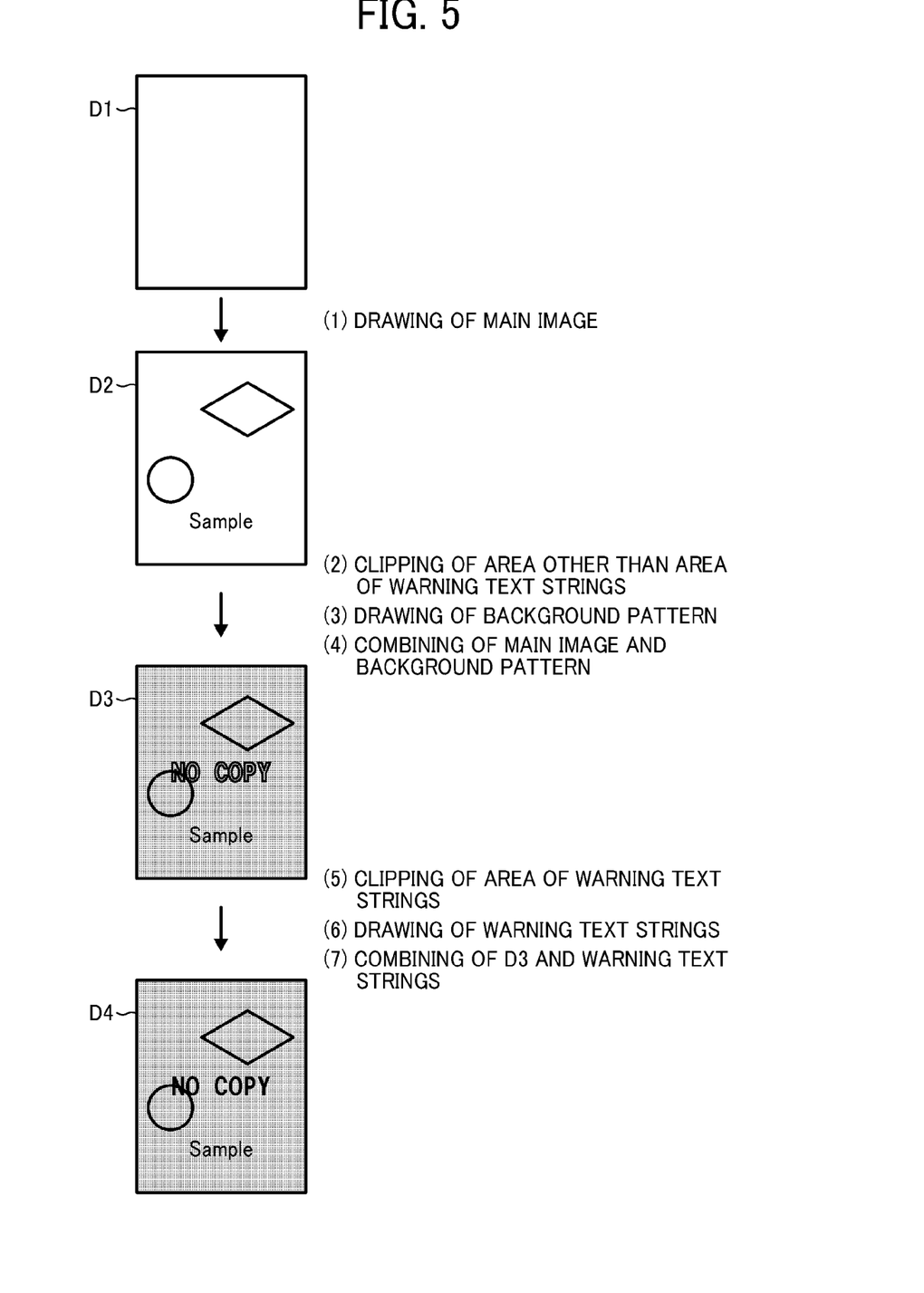
FIG. 5 schematically shows a process of outputting image including a drawing process of background pattern, and a process combining the background pattern to a main image.

FIG. 5 schematically illustrates a process of outputting an image by drawing a main image and a background pattern, and combining the main image and the background pattern. In FIG. 5, D1 to D4 schematically show images corresponding to the output-use data drawn on a page memory, or a band memory when a band process is conducted. As shown in FIG. 5, the image outputting process can be conducted in the order of (1)→(2)→(3)→(4)→(5)→(6)→(7).

(1) Before conducting an image drawing processing, no image data exists on the page memory as shown in D1. Then, a target print data, which may be input as data having a given format such as RGB data, is analyzed to obtain image drawing command. Based on the obtained image drawing command, an image drawing processing is conducted for a main image, which is the target output-image, and the main image is drawn on the page memory as shown in D2.

(2) Then, based on the image drawing command for the background pattern, an area for the background pattern is clipped. At this stage, an area for drawing warning text strings such as "NO COPY" is not yet clipped.

(3) The background pattern corresponding to the image drawing command is drawn on the area clipped at the above (2).

(4) The background pattern drawn at the above (3) and the main image drawn at the above (1) are combined by the logical sum operation (OR operation). The combined image becomes an image as shown in D3, in which the area for drawing the warning text strings such as "NO COPY" is set as a blank area (white area), which is a not-yet-drawing area at this stage.

(5) Then, the area for drawing the warning text strings such as "NO COPY" is clipped based on the corresponding image drawing command.

(6) Then, the warning text strings such as "NO COPY" is drawn at the area clipped at the above (5), by which the warning text strings such as "NO COPY," which is the blank area (or white area) in D3, is drawn.

(7) The combined image D3 at the above (4) and the warning text strings such as "NO COPY" drawn at the above (6) are combined by the logical sum operation (OR operation), by which a combined image matched to a desired output image can be obtained as shown in D4.

As shown in FIG. 5, the background image such as background pattern and warning text strings can be processed by an image drawing processing based on the pre-set or pre-prepared image data, which is a different image drawing processing with respect to an image drawing processing for the primary image or main image used as target output-image. Then, the background image such as background pattern and warning text strings can be combined with the main image as an outputting image.

In the above described image outputting process, the background pattern data and text strings data may be pre-prepared using output-use data format such as CMYK data. Therefore, if a conventional hardware accelerator adapted for RGB image data is used for an image drawing processing of background pattern data expressed by CMYK data, the processing efficiency cannot be enhanced. In such a case, a CPU may conduct an image drawing processing for background pattern data using software programs, which may not enhance the processing speed for image drawing processing.

In light of such processing speed issue for conventional arts, in an example embodiment, a HW accelerator adapted for CMYK data is employed to enhance the processing speed for image drawing processing. The HW accelerator adapted for CMYK data may be a hardware processor disposed for conducting a given image drawing processing. The HW accelerator adapted for CMYK data can draw a background image having a given background pattern and/or text strings as shown in FIG. 5 by processing the background pattern data expressed by CMYK data based on the image drawing command set for the background pattern.

Further, the HW accelerator can conduct the logical sum operation (OR operation) in CMYK color space for combining the background pattern data, and the main image processed by other image drawing process.

Conventionally, as shown in FIG. 2, the image drawing processing using the background pattern drawing command is conducted by an image drawing processing unit configured as a software-implemented unit in an image drawing core module. Such conventional image drawing processing is not used for drawing the background pattern in the above described example embodiment. Instead, in an example embodiment, a CMYK HWA 121 corresponding to the HWA 21 shown in FIG. 4 is disposed externally for an image forming apparatus for conducting the image drawing processing using data output-able by the image forming apparatus such as CMYK data. As such, the CMYK HWA 121 can be used as a hardware processor to draw CMYK data.

(PDL Unit)

Figure 6:
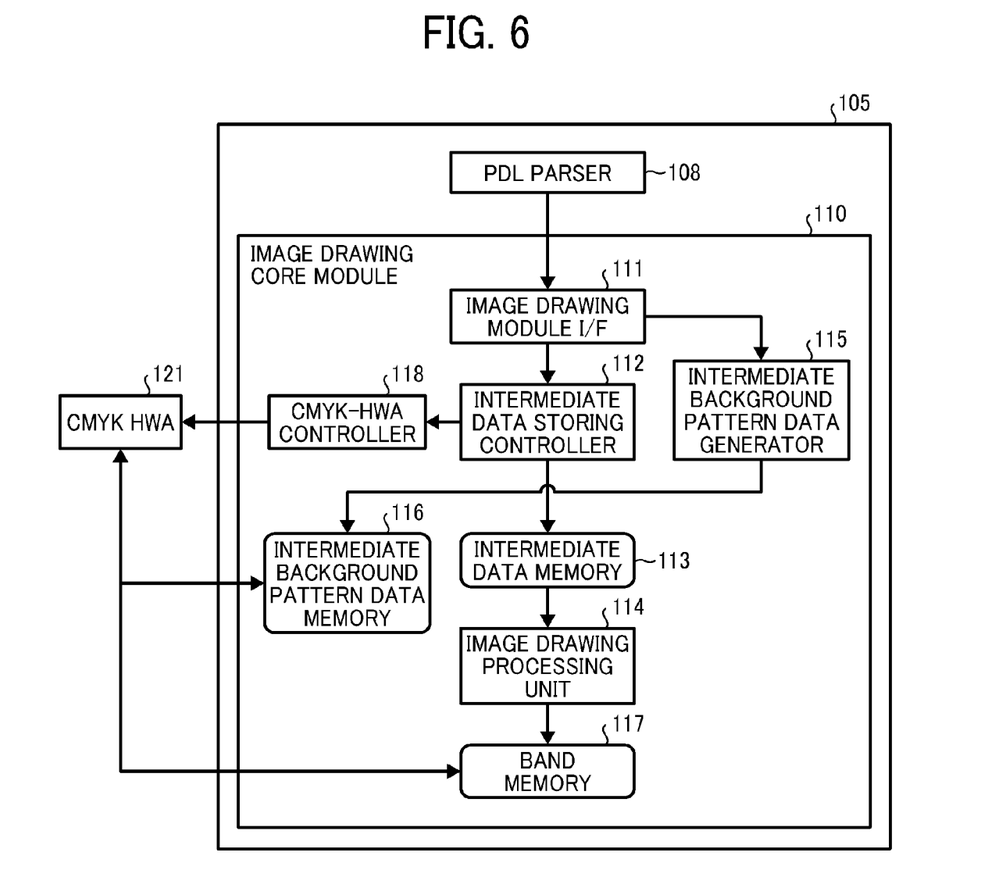
FIG. 6 shows a functional block diagram of a PDL unit shown in FIG. 4.

The PDL unit 105, which can be activated under the control of the printer control system unit 104 of the controller 10 (FIG. 4), may be externally disposed with a hardware accelerator (HWA) adapted for processing given format data such as CMYK data as shown in FIG. 6, and the PDL unit 105 can prepare or generate printout-use image data based on print data described by PDL such as PostScript (registered trademark), PCL (registered trademark), and RPDL (registered trademark), wherein the print data may be transmitted from the host PC 40 with a print request, requesting printout of the print data.

The PDL unit 305a used for conventional arts (FIG. 2) conducts the image drawing processing for the background pattern drawing command using a software-implemented configuration as above described. In an example embodiment, the PDL unit 105 modifies the image drawing processing for the background pattern drawing command compared to conventional arts, and the PDL unit 105 may be added with one or more devices and units required to use the HWA 21.

FIG. 6 shows a functional block diagram of the PDL unit 105 shown in FIG. 4, wherein the PDL unit 105 includes a PDL parser 108, and an image drawing core module 110. The PDL parser 108 analyzes structure of print data described by PDL. The image drawing core module 110 prepares or generates output-use data such as printout-use image data based on an image drawing command obtained as an analysis result of the PDL parser 108. In this disclosure, image drawing command may mean one or more image drawing commands.

Further, the PDL unit 105 is externally disposed with a hardware accelerator (HWA) such as a CMYK HWA 121, which may be under the control of the PDL unit 105. The CMYK HWA 121 may be a hardware processor disposed for conducting given image drawing processing, and such CMYK HWA 121 can be referred to as an image drawing processing unit. The CMYK HWA 121 conducts an image drawing processing for background pattern data expressed by CMYK data based on the corresponding background pattern drawing command, and conducts the logical sum operation (OR operation) for the background pattern data processed and obtained by the image drawing processing, and the main image used as the target output-image in CMYK color space, by which the background pattern and the main image can be combined as an image.

In an example embodiment, the PDL parser 108 may receive the background pattern drawing command as a command included in the image drawing command transmitted with print data. For example, such received background pattern drawing command may be included in the image drawing command set for print data, or such received background pattern drawing command may be input by operating the keys or the like of the control panel of the printer 20 after preparing print data, in which the background pattern drawing command can be input by a user's operation of the control panel 24. Preferably, the background pattern data may be prepared in advance, by which the conditions of processing mode that draws the background pattern data can be set easily by using the background pattern data.

Further, the PDL parser 108 manages the background pattern data prepared in advance and expressed by CMYK data to support the image drawing process of background pattern. The background pattern data can be used with corresponding background pattern drawing command, and when a plurality of background pattern data and a plurality of background pattern drawing commands are used, each background pattern data can be corresponded to corresponding background pattern drawing command, and then stored, for example, in the ROM 12.

When the controller 10 is activated, the PDL parser 108 obtains the background pattern data from the ROM 12 that retains and stores background pattern data, and manages the background pattern data in the PDL unit 105. The PDL parser 108 analyzes the background pattern drawing command, and transfers the analyzed image drawing command and background pattern data corresponding to the analyzed image drawing command to the image drawing core module 110. If a print request is issued while attaching background pattern data to the image drawing command, the PDL parser 108 transfers the image drawing command and the background pattern data attached to the analyzed image drawing command to the image drawing core module 110.

The image drawing core module 110 includes an image drawing module interface (I/F) 111, an intermediate data storing controller 112, an intermediate data memory 113, an image drawing processing unit 114, a band memory 117, an intermediate background data generator 115, an intermediate background data memory 116, and a CMYK-HWA controller 118, wherein the CMYK-HWA controller 118 controls the CMYK HWA 121 to conduct image drawing processing for CMYK data having fewer color gradations. The image drawing module I/F 111 is used as an interface to receive data or the like such as the image drawing command, and image drawing conditions from the PDL parser 108.

The intermediate data storing controller 112 receives the image drawing command and image drawing conditions from the image drawing module I/F 111, and stores such command and condition data as intermediate data. The image drawing command includes the image drawing command for drawing objects such as text, images, and vector graphics, the image drawing command for drawing background pattern, and the image drawing conditions such as color condition and transparency level. The intermediate data memory 113 is used as a memory storing the intermediate data.

The image drawing processing unit 114 conducts rendering for printout-use image data based on the intermediate data used for drawing image. The band memory 117 stores data that has received given image drawing processing as the processed data.

The intermediate background data generator 115 prepares or generates intermediate background data based on the background pattern drawing command and image drawing conditions received from the image drawing module I/F 11. The intermediate background data memory 116 is a memory to store the intermediate background data prepared by the intermediate background data generator 115. Under the instruction of the intermediate data storing controller 112, the CMYK-HWA controller 118 controls the CMYK HWA 121. The CMYK-HWA controller 118 and CMYK HWA 121 conduct processing of CMYK data having fewer color gradations.

Further, the intermediate data storing controller 112 determines whether the image drawing command received via the image drawing module I/F 111 includes an image drawing command for drawing background pattern, which can be processed by the CMYK HWA 121. When the intermediate data storing controller 112 determines that the image drawing command received via the image drawing module I/F 111 includes the image drawing command for drawing background pattern, the image drawing command for drawing background pattern can be transmitted to and received by the CMYK-HWA controller 118. Based on the image drawing command for drawing background pattern, the CMYK-HWA controller 118 instructs the CMYK HWA 121 to conduct an image drawing processing for background pattern.

With such a configuration for drawing images, under the control of the CMYK-HWA controller 118, the CMYK HWA 121 conducts an image drawing processing for the background pattern using the background pattern data expressed by CMYK data, which may be stored in the intermediate background data memory 116, wherein such process may be referred to as a second drawing process. Further, the CMYK HWA 121 conducts the logical sum operation (OR operation) for the background pattern and the main image used as the target output-image in CMYK color space, by which the background pattern and the main image can be combined as an image.

Based on the image drawing command for drawing background pattern included in the image drawing command attached to the print data such as PDL data, the CMYK HWA 121 can process given background pattern drawing command included in the print data (e.g., PDL data), and the CMYK HWA 121 can prepare or generate printout-use data by combining the background pattern and the main image. Compared to conventional arts shown in FIGS. 1 and 2 using an image drawing processing unit configured by implementing software programs for conducting an image drawing processing for the background pattern data, in the example embodiment, the total processing speed can be set faster using the pre-set or prepared CMYK data.

(Process of Outputting Image)

Figure 7:
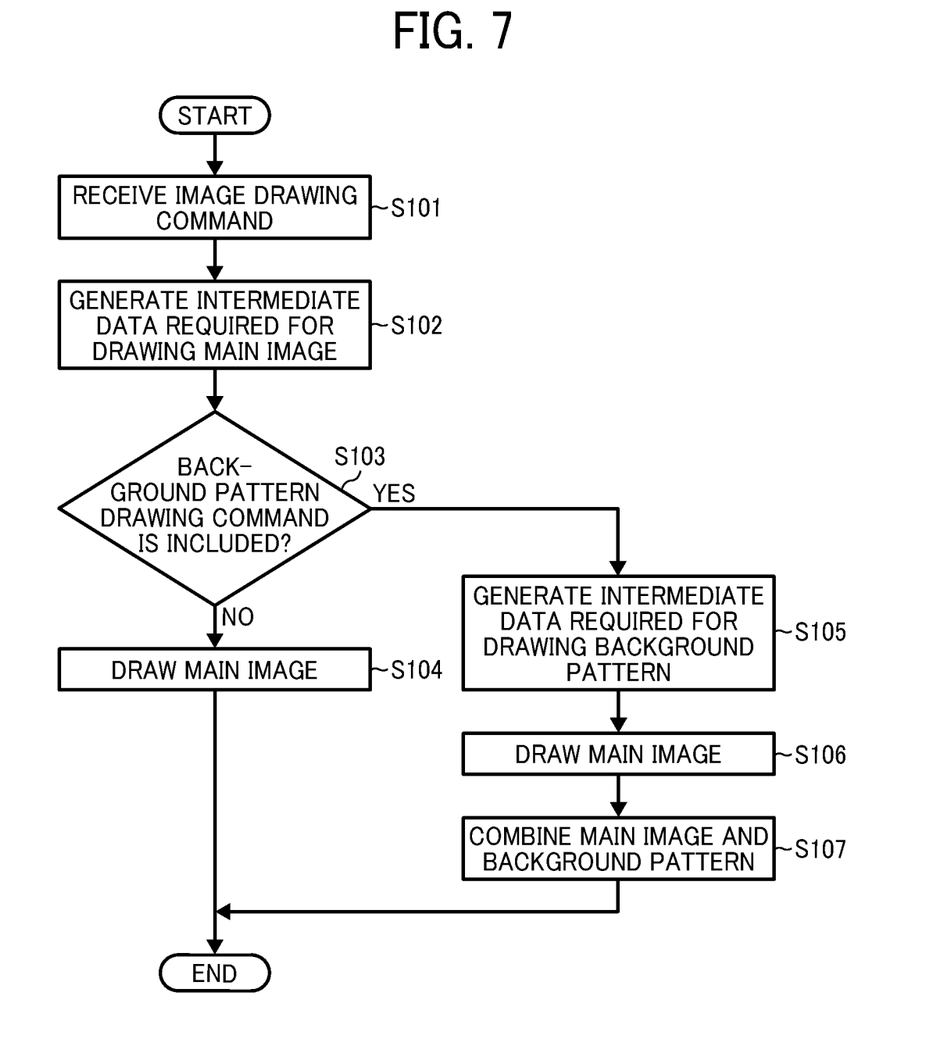
FIG. 7 shows a flow chart of process of outputting image using the PDL unit of FIG. 6 conduct-able based on image drawing command.

A description is given of process of outputting image using the PDL unit 105 (FIG. 6) based on the image drawing command with reference to FIG. 7. The process shown in FIG. 7 can be conducted by the image drawing core module 110, which is included in the PDL unit 105 that can be activated under the control of the printer control system unit 104. The process shown in FIG. 7 can be activated when an image drawing processing is instructed to start.

For example, the process shown in FIG. 7 can be activated when an information processing apparatus such as an image forming apparatus receives a print job from the host PC 40, wherein such print job may include RGB data. Further, the process shown in FIG. 7 can be activated when an information processing apparatus such as an image forming apparatus receives a print job, and then conditions of image drawing processing for background pattern is added to the print job by operating the control panel 24, and the image drawing processing is started. As such, the image drawing processing can be started at a given timing.

When the process shown in FIG. 7 is activated, the image drawing module I/F 111 receives the image drawing command analyzed by the PDL parser 108 that analyzes the print data (step S101), and the intermediate data storing controller 112 and the intermediate background data generator 115 may receive the image drawing command required for each of the intermediate data storing controller 112 and the intermediate background data generator 115.

The intermediate data storage controller 112 prepares or generates intermediate data required for drawing a main image used as the target output-image based on the received image drawing command (step S102), and stores the generated intermediate data in the intermediate data memory 113, wherein such process may be referred to as a first drawing process.

Then, the intermediate data storing controller 112 checks whether the image drawing command received from the image drawing module I/F 111 includes a background pattern drawing command (step S103). The process after step S103 is separated depending on a check result at step S103.

If the background pattern drawing command is not included in the received image drawing command (step S103: NO), under the instruction of the intermediate data storing controller 112, the image drawing processing unit 114 conducts an image drawing processing for the main image using the intermediate data, which may be stored in the intermediate data memory 113 at step S102 (step S104). Because it is determined that the background pattern drawing command is not present, an image drawing processing for background pattern by the CMYK HWA 121 is not required, and thereby the process ends. As such, when print data including main image data expressed by a given data format input-able to the image forming apparatus is processed, the main image data can be converted to output-able data of the image forming apparatus based on the image drawing command for the main image data included in the print data, wherein such process may be referred to as the first drawing process.

In contrast, if the background pattern drawing command is included in the received image drawing command (step S103: YES), the image drawing processing for the background pattern by the CMYK HWA 121 is required, in which the intermediate data storing controller 112 instructs the CMYK-HWA controller 118 to conduct an image drawing processing, and activates the intermediate background data generator 115.

Then, the intermediate background data generator 115 prepares or generates intermediate background data required for drawing the background image based on the background pattern drawing command (step S105), and stores the generated intermediate background data in the intermediate background data memory 116.

The intermediate background data used for drawing the background pattern may include background pattern data, text strings, or the like, which may be designated by a printer driver of the host PC 40 or from the control panel 24. The intermediate background data is prepared as data that can be processed by the CMYK HWA 121.

Further, the data stored in the intermediate background data memory 116 can be used for a plurality of times. For example, the data stored in the intermediate background data memory 116 can be used for the first page of the concerned print job including a plurality of pages, and such data can be also used for the second page, third page, and so on of the concerned print job.

In the process flow shown in FIG. 7, the intermediate background data is generated after the intermediate data storing controller 112 checks whether the background pattern drawing command is included at step S103. However, the intermediate background data can be generated without waiting the checking operation by the intermediate data storing controller 112 at step S103, in which the intermediate background data generator 115 can generate the intermediate background data at give timing without waiting the checking operation by the intermediate data storing controller 112.

Then, under the instruction of the intermediate data storing controller 112, the image drawing processing unit 114 conducts an image drawing processing for the main image based on the intermediate data stored in the intermediate data memory 113 (step S106).

Then, the CMYK HWA 121 draws the background pattern based on the intermediate background data stored in the intermediate background data memory 116 at step S105, and further combines the background pattern and the main image drawn at step S106 (step S107). The CMYK HWA 121 conducts the image drawing processing under the control of the CMYK-HWA controller 118 activated by the intermediate data storing controller 112. The combined image combined by the CMYK HWA 121 can be stored as an output-use data or printout-use data in the band memory 117, and then the process ends.

As such, the CMYK-HWA controller 118 controls the CMYK HWA 121 to conduct a drawing process of pre-set image data settable to the image forming apparatus and expressed by an output-able data format output-able by the image forming apparatus, wherein such drawing process of pre-set image data may be referred to as the second drawing process. Further, the CMYK HWA 121 may be used as a hardware processor, controllable by the CMYK-HWA controller 118 when the image drawing command for the pre-set image is received, to conduct the drawing process for the pre-set image data based on an image drawing command set for the pre-set image data to prepare the pre-set image data as output-able data of the image forming apparatus, and to combine the main image data expressed as the output-able data and the pre-set image expressed as the output-able data as an outputting image.

As above described, when the process of outputting images is conducted, a pattern data can be prepared in advance using a data format adapted for the output-use or printout-use such as CMYK data. Such pattern data can be combined with the main image used as the target output-image. When the image drawing processing is to be conducted, the image drawing core module 110 activates a function to separate the image drawing processing for the main image and the image drawing processing for the pattern data, in which the main image may be processed at least partially by the image drawing processing unit configured by software-implementation, and the pattern data can be processed by the hardware accelerator (HWA), which may be a hardware processor disposed for processing given data format such as CMYK data.

In the above described image drawing processing, the background pattern is used as a pattern image to be combined with the main image. However, such pattern image is not limited to the background pattern, but other patterns can be prepared and combined with the main image. For example, a given pattern image expressed as output-use data such as CMYK data can be used as the pattern image for image forming apparatuses, in which such pattern image may be drawn on a large area or a plurality of pages.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented using software and hardware, each and every aspect of the present invention thus encompasses computer software implementable on a programmable device. The computer software can be provided to the programmable device using any storage medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as universal serial bus (USB) memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In the above-described example embodiment, processing units, computing units, or controllers can be configured with using various types of processors, circuits, or the like such as a programmed processor, a circuit, an application specific integrated circuit (ASIC), used singly or in combination.

As above described, the background pattern can be prepared as printout-use data such as CMYK data, and the background pattern can be combined with the main image used as the target output-image. In such configuration combining the main image with the printout-use image data, the total image drawing processing can be conducted faster or accelerated.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus, comprising:
a controller to control a first drawing process and a second drawing process, the controller including a page description language (PDL) unit therein, the PDL unit configured to,
separate an image drawing command into main image data and pre-set image data, the main image data being image data in a format having a first number of color gradations and the pre-set image data being image data in a format having a second number of color gradations less than the first number of color gradations, and
perform, via a first image drawing processor, the first drawing process; and
a second image drawing processor configured to perform the second drawing processor, the second image drawing processor being a discrete processor from the first image drawing processor and configured to function as a hardware accelerator (HWA), wherein
in the first drawing process, the first image drawing processor processes the main image data to convert the main image data based on the image drawing command, and
in the second drawing process, the second drawing processor processes the pre-set image data based on an image drawing command set for the pre-set image data and combines the main image data and the pre-set image as an output image.

2. The image forming apparatus of claim 1, wherein the image drawing command for the pre-set image data is a command for drawing a background pattern, and the pre-set image data is background pattern data.

3. The image forming apparatus of claim 2, wherein the background pattern is stored in a background data memory of the image forming apparatus and the second image drawing processor is configured to reuse the stored background pattern in subsequent executions of the second drawing process.

4. The image forming apparatus of claim 1, wherein the format of the main image data is RGB, and the format of the pre-set image data is CMYK.

5. The image forming apparatus of claim 1, wherein the image drawing command for the pre-set image data is a command for drawing a background pattern,
wherein background pattern and text string data are attached to the command for drawing the background pattern.

6. The image forming apparatus of claim 1, wherein the second image drawing processor is configured to perform a logical sum operation in a CMYK color space of the pre-set image data and the main image data.

7. A non-transitory computer readable storage medium storing a program that, when executed by a computer, causes the computer to execute a method of controlling a first drawing process and a second drawing process, the method comprising:
separating an image drawing command into main image data and pre-set image data, the main image data being image data in a format having a first number of color gradations and the pre-set image data being image data in a format having a second number of color gradations less than the first number of color gradations;
performing, via a first image drawing processor, the first drawing process to draw the main image data based on an image drawing command included in the print data;
performing via a second image drawing processor, the second drawing process to draw the pre-set image data based on an image drawing command set for the pre-set image data, the second image drawing processor being a discrete processor from the first image drawing processor and configured to function as a hardware accelerator (HWA); and combining, via the second image drawing processor the drawn main image data and the drawn pre-set image data as an output image.

8. A method of controlling a first drawing process and a second drawing process, the method comprising:
separating an image drawing command into main image data and pre-set image data, the main image data being image data in a format having a first number of color gradations and the pre-set image data being image data in a format having a second number of color gradations less than the first number of color gradations;
performing, via a first image drawing processor, the first drawing process to draw the main image data based on an image drawing command included in the print data;
performing, via a second image drawing processor, the second drawing process to draw the pre-set image data based on an image drawing command set for the pre-set image data, the second image drawing processor being a discrete processor from the first image drawing processor and configured to function as a hardware accelerator (HWA); and
combining, via the second image drawing processor, the drawn main image data and the drawn pre-set image data as an output image.

9. The method of claim 8, wherein the performing of the second image drawing process includes performing, via the second image drawing processor, a logical sum operation in a CMYK color space of the pre-set image data and the main image data.

10. The method of claim 8, wherein the background pattern is stored in a background data memory of the image forming apparatus and the performing of the second image drawing process includes reusing the stored background pattern in subsequent executions of the second drawing process.

* * * * *